(12) United States Patent
Radermacher et al.

(10) Patent No.: US 6,293,769 B1
(45) Date of Patent: Sep. 25, 2001

(54) CANNED PUMP WITH DRY ROTOR COMPARTMENT

(75) Inventors: Bernhard Radermacher, Viersen; Henning Garcke, Willich, both of (DE)

(73) Assignee: Pierburg AG, Neuss (DE)

( * ) Notice: Subject to any disclaimer, the term of this patent is extended or adjusted under 35 U.S.C. 154(b) by 0 days.

(21) Appl. No.: 09/496,062

(22) Filed: Feb. 1, 2000

(30) Foreign Application Priority Data

Feb. 3, 1999 (DE) .............................. 199 04 148

(51) Int. Cl.$^7$ .................................................. F04B 17/00
(52) U.S. Cl. .................. 417/357; 417/366; 417/423.11; 417/369; 417/371
(58) Field of Search ..................... 417/357, 366, 417/423.7, 423.11, 423.14, 369, 371

(56) References Cited

U.S. PATENT DOCUMENTS

| 2,261,915 | * | 11/1941 | Korte et al. | 103/87 |
| 2,887,062 |   | 5/1959  | Cametti | 103/87 |
| 3,836,291 | * | 9/1974  | Bottcher et al. | 417/423 |
| 4,465,437 | * | 8/1984  | Jensen et al. | 417/366 |
| 4,878,804 | * | 11/1989 | Akerman et al. | 415/111 |
| 4,990,068 | * | 2/1991  | Zhong et al. | 417/423.8 |
| 5,401,146 | * | 3/1995  | Moriya et al. | 417/423.14 |
| 5,785,013 | * | 7/1998  | Sinn et al. | 123/41.44 |

FOREIGN PATENT DOCUMENTS

| 8607609  | 8/1986  | (DE). |
| 4121430  | 11/1992 | (DE). |
| 4304149  | 9/1994  | (DE). |
| 29613050 | 10/1996 | (DE). |
| 3702028  | 4/1997  | (DE). |

* cited by examiner

Primary Examiner—Timothy S. Thorpe
Assistant Examiner—Timothy P. Solak
(74) Attorney, Agent, or Firm—Ladas & Parry

(57) ABSTRACT

An electric pump for a liquid has a rotor surrounded by a stator which is disposed in the flow path of the liquid, the rotor being disposed in a rotor compartment, which is sealed from the flow path of the liquid and is predominantly filled with a mixture of air and vaporized liquid. The rotor compartment is in communication with the ambient atmosphere through a vent orifice. A vent system in the form of a labyrinth seal and a liquid-tight, gas-permeable membrane is interposed between the vent orifice and the ambient atmosphere. The rotor bearings are lubricated in one embodiment by leakage liquid and its vaporized product within the rotor compartment. In another embodiment the rotor bearings are disposed in the liquid flow path outside seals between the rotor and the rotor compartment.

7 Claims, 1 Drawing Sheet

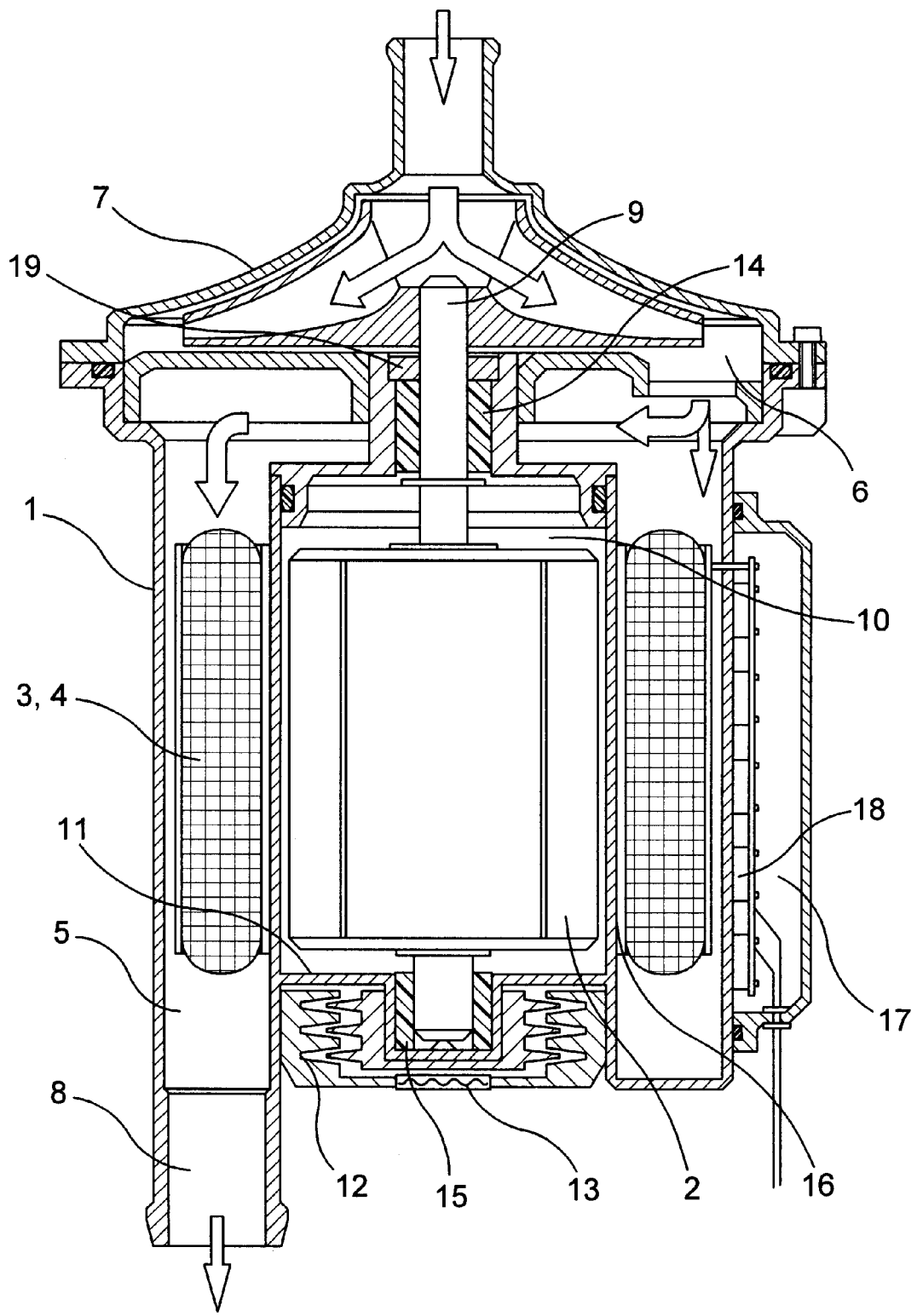

CANNED PUMP WITH DRY ROTOR COMPARTMENT

FIELD OF THE INVENTION

The invention relates to an electric feed pump having a stator disposed in the path of flow of a liquid feed and a rotor isolated from the liquid feed path.

BACKGROUND AND PRIOR ART

Such feed pumps are used, for example, for pumping cooling water. These pumps are classified as wet-rotor motors in which the rotors are in contact with the pumped liquid and a distinction is made between stator windings which are in contact with the pumped liquid (wet stator windings) and those which are not (dry stator windings). A wet stator winding can operate at high current levels because it is cooled by the pumped liquid.

It has been found, however, that if the rotor is contacted with the pumped liquid, large losses due to liquid turbulence are produced.

German patent DE 43 04 149 C1 discloses a liquid feed pump in which a rotor compartment and a stator compartment are hermetically sealed from a cooling compartment through which liquid is flowing. As a result the bearings of the rotor in the rotor compartment are not adequately lubricated

SUMMARY OF THE INVENTION

An object of the invention is to provide means by which this inadequate lubrication is avoided.

This object is achieved by disposing the rotor in a rotor compartment isolated from the liquid flow and containing a gas and providing the rotor compartment with a vent orifice connected to the ambient atmosphere. By this arrangement the electric feed pump can be operated at high efficiency in motor vehicles to pump a cooling liquid.

BRIEF DESCRIPTION OF THE DRAWING

The sole FIGURE of the drawing is a longitudinal section through an electric feed pump according to the invention.

DETAILED DESCRIPTION

The drawing shows an electric pump 1 having an electric motor with an internal rotor 2 and an external stator 3. Stator 3 together with its stator windings 4 is disposed in the flow path of a liquid traveling in a compartment 5 of the housing of the pump. In the illustrated embodiment, the compartment 5 is in communication with an outlet 6 of a centrifugal pump unit 7 and with an outlet duct 8 of the electric pump 1. Centrifugal pump unit 7 is driven by a shaft 9 connected to rotor 2.

Rotor 2 is disposed in a rotor compartment 10, which is sealed from housing compartment 5 and from the liquid flowing therein. The rotor compartment is filled with a gas (air) and consequently, losses due to liquid turbulence are reduced.

The rotor compartment 10 is provided with a vent orifice 11 communicating with the ambient atmosphere. Vent orifice 11 advantageously communicates with the ambient atmosphere via a labyrinth seal 12.

In addition, the vent orifice 11 is closed by a liquid-tight but gas-permeable membrane 13. The labyrinth seal 12 and the membrane 13 form a vent system permitting venting of air and vapor in the rotor compartment while preventing liquid outflow therefrom. Thereby, any leakage of feed liquid into rotor compartment 10 through a rotor bearing 14 on the side of the pump unit or through rotor bearing 15 is vapororized in rotor compartment 10 at the operating temperature of the feed pump and therefore any liquid which has entered the rotor compartment can escape as a vapor through seal 12 and membrane 13 into the ambient atmosphere.

It is provided that the volumes of vapor and liquid present in rotor compartment 10 are partly confined by rotor bearings 14, 15, whereby highly effective lubrication of rotor 2 and shaft 9 in rotor bearings 14, 15 is achieved.

An electronic unit 18 for power supply to the electric motor is mounted on an outside wall of feed compartment 5 and is supported in a housing compartment 17 which is isolated from the liquid feed. The power unit 18 is cooled by heat exchange through the outside wall of compartment 5 to minimize overheating of the power supply unit 18.

In the illustrated embodiment, a shaft seal 19 is disposed upstream of rotor bearing 14 to prevent leakage of feed liquid from the pump compartment into the rotor compartment. Under certain circumstances, the seal 19 can also be disposed downstream of rotor bearing 14, in which case rotor bearing 14 would be completely exposed to the feed liquid and lubricated thereby.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. An electric pump for pumping a liquid comprising a rotor, a stator surrounding said rotor and located in a flow path of the liquid being pumped, a rotor compartment containing said rotor and isolated from the flow path of the liquid, said rotor compartment having a vent orifice open to ambient atmosphere, and a vent system connecting said vent orifice with the ambient atmosphere to permit venting of gas from said rotor compartment to the ambient atmosphere, while blocking outflow of liquid during operation of the pump.

2. An electric pump as claimed in claim 1, wherein said vent system comprises a labyrinth seal.

3. An electric pump as claimed in claim 2, wherein said vent system further comprises a liquid-tight, gas permeable membrane downstream of said labyrinth seal.

4. An electric pump as claimed in claim 3, wherein said vent system is constructed and arranged to block outflow of any liquid which leaks into the rotor compartment so that the liquid is vaporized and escapes into the ambient atmosphere as a vapor.

5. An electric pump as claimed in claim 4, wherein said rotor includes bearings with seals closing said rotor compartment.

6. An electric pump as claimed in claim 5, wherein said bearings are exposed to vapor and leakage liquid in said rotor compartment so as to be lubricated thereby.

7. An electric pump as claimed in claim 1, comprising a power supply unit mounted on an outside wall bounding said flow path of the liquid so as to be cooled by said liquid.

* * * * *